(12) United States Patent  
Calligaro et al.

(10) Patent No.: US 7,299,303 B2  
(45) Date of Patent: Nov. 20, 2007

(54) SYSTEM AND METHOD FOR PENDANT BUS FOR SERIALLY CHAINING MULTIPLE PORTABLE PENDANT PERIPHERALS

(75) Inventors: Michael P. Calligaro, Redmond, WA (US); David William Voth, Woodinville, WA (US); Randal J. Ramig, Seattle, WA (US); Roberto Cazzaro, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1109 days.

(21) Appl. No.: 10/158,541

(22) Filed: May 29, 2002

(65) Prior Publication Data

US 2003/0133471 A1 Jul. 17, 2003

Related U.S. Application Data

(60) Provisional application No. 60/349,787, filed on Jan. 16, 2002.

(51) Int. Cl.  
*G06F 13/00* (2006.01)  
*G06F 3/00* (2006.01)  
*G06F 13/42* (2006.01)

(52) U.S. Cl. .............. 710/10; 710/8; 710/9; 710/33

(58) Field of Classification Search .......... 710/8–10, 710/33  
See application file for complete search history.

(56) References Cited

U.S. PATENT DOCUMENTS

| | | | |
|---|---|---|---|
| 5,537,605 A * | 7/1996 | Teece | 712/1 |
| 5,617,420 A | 4/1997 | Whetsel | |
| 5,819,051 A | 10/1998 | Murray et al. | |
| 5,938,742 A * | 8/1999 | Faddell et al. | 710/9 |
| 6,665,742 B2 * | 12/2003 | Owen et al. | 710/10 |
| 6,686,530 B2 * | 2/2004 | Juszkiewicz et al. | 84/600 |

OTHER PUBLICATIONS

Cypress Semiconductor Corp. "*USB On-The-Go Protocol*" pp. 1-79.

* cited by examiner

*Primary Examiner*—Tammara Peyton  
(74) *Attorney, Agent, or Firm*—Merchant & Gould P.C.

(57) ABSTRACT

A communication protocol for use between serially chained portable pendant peripherals and a portable host device. The bus communications system protocol enables multiple low power input/output peripherals to communicate over a bi-directional data line with a portable host device such as a PDA or cellular phone. A message packet data structure for use in the bus communications system includes a device identifier, a packet type identifier, and message data bits. The packet type identifier describes the actions associated with the packet. A method determines whether the message packet received by a device is intended for the device by evaluating if the device identifier is zero. If the device identifier is other than zero, the method modifies the device identifier and communicates the message packet to another device in the bus communications system.

8 Claims, 20 Drawing Sheets

| Bits | Field Designator | Value | Description |
|---|---|---|---|
| 47:12 | Data | | Depends on Control Type |
| 19:12 | Control Type | 0x00 | Error Packet |
| | | 0x01 | Plug Unplug |
| | | 0x02 | Soft Reset |
| | | 0x03 | Hard Reset |
| | | 0x04 | Get Dev Caps |
| | | 0x05 | Device GUID |
| | | 0x07-0xFF | Reserved |
| 11:8 | PacketType | 0x0 | Control Packet |
| 7:4 | DeviceId | ID | Device Identification |
| 3:0 | BusVersion | 0x1 | This is bus protocol version # |

*Fig. 4.*

| Bits | Field | Value | Description |
|---|---|---|---|
| 47:28 | Reserved | 0x0 | Reserved |
| 27:20 | ErrorCode | 0x00 | PENDANT_NO_ERROR<br>No error occurred. |
| | | 0x01 | PENDANT_ERROR_TOO_MANY_DEVICES<br>Too many devices have been chained together. |
| | | 0x02 | PENDANT_ERROR_PACKET_CORRUPTED<br>Used if a packet is recognizably garbled or if a multi-packet communication gets out of sequence. |
| | | 0x03 | PENDANT_ERROR_NO_GUID<br>The device requested an action that requires a GUID, but the device has not yet sent a GUID (or it was corrupted). |
| | | 0x04 | PENDANT_ERROR_SOFTWARE_NOT_INSTALLED<br>The device requested a driver or application that has not been installed on the host system. |
| | | 0x05 | PENDANT_ERROR_UNSUPPORTED<br>Either the host sent a command that the device does not support, or the device sent a command that the host does not support |
| | | 0x06 | PENDANT_ERROR_DROPPED_PACKET<br>For some reason, a device received or generated too much data for its internal buffering, and was forced to drop one or more packets. |
| | | 0x07 - 0xFF | Reserved |
| 19:12 | Control Type | 0x0 | This is an error packet |
| 11:8 | PacketType | 0x0 | This is a control packet |
| 7:4 | DeviceId | ID | Device Identification |
| 3:0 | BusVersion | 0x1 | This is bus protocol version# |

*Fig. 5.*

| Bits | Field Designator | Value | Description |
|---|---|---|---|
| 47:36 | Reserved | 0x0 | Reserved |
| 35:20 | Types Supported | 0x0000 | Device is unplugged |
| | | Mask: | |
| | | 0x0001 | Device supports Control packets |
| | | 0x0002 | Device supports Data packets |
| | | 0x0004 | Device supports Command packets |
| | | 0x0008 | Device supports Indicator packets |
| | | 0x0010 | Device supports Character Text packets |
| | | 0x0020 | Device supports Bitmap Text packets |
| | | 0x0040 | Device supports Graphics Display packets |
| | | 0x0080 | Device supports Smart Keyboard packets |
| | | ... | ... |
| | | 0x4000 | Device supports Test packets |
| | | 0x8000 | Device Needs Driver packets |
| 19:12 | Control Type | 0x1 | This is a Plug/Unplug Packet |
| 11:8 | Packet Type | 0x0 | This is a Control Packet |
| 7:4 | Device Identifier | ID | Device Identification |
| 3:0 | Bus Version | 0x1 | Bus Protocol Version # |

*Fig. 6.*

| Bits | Field Designator | Value | Description |
|---|---|---|---|
| 47:20 | Reserved | 0x0 | Reserved |
| 19:12 | ControlType | 0x2 | This is a Soft Reset control packet. |
| 11:8 | PacketType | 0x0 | This is a control packet |
| 7:4 | DeviceId | ID | Device Identification |
| 3:0 | BusVersion | 0x1 | This is bus protocol version # |

*Fig. 7.*

| Bits | Field Designator | Value | Description |
|---|---|---|---|
| 47:20 | Reserved | 0x0 | Reserved |
| 19:12 | ControlType | 0x3 | This is a Hard Reset control packet. |
| 11:8 | PacketType | 0x0 | This is a control packet |
| 7:4 | DeviceId | ID | Device Identification |
| 3:0 | BusVersion | 0x1 | This is bus protocol version# |

*Fig. 8.*

| Bits | Field Designator | Value | Description |
|---|---|---|---|
| 47:21 | Reserved | 0x0 | Reserved |
| 20 | ExtendedInfo | 0x1 | Request Extend Capabilities |
| | | 0x0 | No Extended Capabilities requested |
| 19:16 | DevCapType | 0x0 | Reserved |
| | | 0x1 | Reserved |
| | | 0x2 | Command |
| | | 0x3 | Indicators |
| | | 0x4 | Character Text |
| | | 0x5 | Bitmap Text |
| | | 0x6 | Graphics Display |
| | | 0x7 | Smart Keyboard |
| | | 0xE | Test Packet |
| | | 0xF | Needs Driver |
| 15:12 | ControlType | 0x4 | This is a Get Dev Caps control packet. |
| 11:8 | PacketType | 0x0 | This is a control packet |
| 7:4 | DeviceId | ID | Device Identification |
| 3:0 | BusVersion | 0x1 | This is bus protocol version # |

*Fig. 9.*

| Bits | Field Designator | Value | Description |
|---|---|---|---|
| 47:20 | GUID[27:0] | | Lower 28 bits of GUID |
| 19:12 | ControlType | 0x5 | This is a GUID Packet Type |
| 11:8 | PacketType | 0x0 | This is a control packet |
| 7:4 | DeviceId | ID | Device Identification |
| 3:0 | BusVersion | 0x1 | This is bus protocol version#1 |

*Fig. 10.*

| Bits | Field Designator | Value | Description |
|---|---|---|---|
| 47:12 | Data[35:0] | | Data |
| 11:8 | PacketType | 0x1 | This is a Data Packet |
| 7:4 | DeviceId | ID | Device Identification |
| 3:0 | BusVersion | 0x1 | This is bus protocol version # |

*Fig. 11.*

| Bits | Field Designator | Value | Description |
|---|---|---|---|
| 47:32 | Reserved | 0x0 | Reserved |
| 31:20 | Command | | Command to send. |
| 19:12 | Application | | Application the Command should be sent to. |
| 11:8 | PacketType | 0x2 | This is a Control Packet |
| 7:4 | DeviceId | ID | Device Identification |
| 3:0 | BusVersion | 0x1 | This is bus protocol version # |

*Fig. 12.*

| Value | Application |
|---|---|
| 0x00 | Send command to current foreground application. |
| 0x01 | System (for systemwide commands like power off) |
| 0x02 | Today/Home Screen |
| 0x03 | Start Menu |
| 0x04 | Calendar |
| 0x05 | Contacts |
| 0x06 | Tasks |
| 0x07 | Email |
| 0x08 | Web Browser |
| 0x09 | Instant Messenger |
| 0x0A | Phone |
| 0x0B | Dialer (if separate. May default to Phone if combined.) |
| 0x0C | Call Log (if separate. May default to Phone if combined.) |
| 0x0D | Word Processor |
| 0x0E | Spreadsheet |
| 0x0F | Note Taker |
| 0x10 | Terminal Services Client |
| 0x11 | Calculator |
| 0x12 | Beam Application |
| 0x13 | Ebook Reader |
| 0x14 | Media Player |
| 0x15 | Voice Recorder (may be mapped to note taker). |
| 0x16 | Shortcuts |
| 0x17 | Syncronization Application |
| 0x18 | Newsgroup Reader |
| 0x19 | Map |
| 0x20 | Home Finance (checkbook) |
| 0x21 | Slide Show |
| 0x22 | Programs |
| 0x23 | Settings |
| 0x24 – 0xEF | Reserved |
| 0xF0 – 0xFF | Pendant-specific ISV applications |

*Fig. 13.*

| Bits | Field Designator | Value | Description |
|---|---|---|---|
| 39 | Hld | | call on hold. |
| 38 | Fwd | | Call forwarding |
| 37 | Msd | 0x0 | No calls were missed. |
| | | 0x1 | There was a missed call. |
| 36 | Ln2 | 0x0 | The phone is configured to use line 1. |
| | | 0x1 | The phone is configured to use line 2. |
| 35 | Ag/d | 0x0 | The phone is in the standard mode. |
| | | 0x1 | If this is an analog/digital phone |
| 34 | Rom | 0x0 | The phone is not in roam mode. |
| | | 0x1 | The phone is roaming |
| 33 | Rng | 0x0 | The notification has not occurred |
| | | 0x1 | The phone is ringing |
| 32 | Sync | 0x0 | The notification has not occurred. |
| | | 0x1 | The device is synchronizing data. |
| 31 | Bud | 0x0 | The notification has not occurred. |
| | | 0x1 | An instant messenger buddy has gone online. |
| 30 | IM | 0x0 | The notification has not occurred. |
| | | 0x1 | An instant messenger message has arrived. |
| 29 | User | 0x0 | The notification has not occurred. |
| | | 0x1 | Some event that the user specified as important has happened. |
| 28 | Sys | | general system notification |
| 27 | Apt | 0x0 | The notification has not occurred. |
| | | 0x1 | A clock alarm or calendar appointment has gone off. |
| 26:25 | MP | | Media Player State |
| | | 0x0 | Stopped |
| | | 0x1 | Paused |
| | | 0x2 | Playing |
| | | 0x3 | Reserved |
| 24:22 | Batt | 0x0-7 | Battery levels 0-7, 0 = Lowest, 7 = Highest (Most charged) |
| 21:19 | Vol | 0x0 | Off |
| | | 0x1-6 | Volume level 1-6 |
| | | 0x7 | Volume is off but Vibrate is on. |
| 18:17 | Msg | | A message is waiting; Email; Voice mail. SMS message. |
| 16:15 | Rad | | Radio Mode |
| 14:12 | SigStr | | Signal Strength |
| 11:8 | PacketType | 0x3 | This is an Indicator packet. |
| 7:4 | DeviceId | ID | Device Identification |
| 3:0 | BusVersion | 0x1 | This is bus protocol version # |

*Fig. 14.*

| Bits | Field Designator | Value | Description |
|---|---|---|---|
| 47:32 | UnicodeChar1[15:0] | | The (optional) second Unicode character. |
| 31:16 | UnicodeChar0[15:0] | | The first Unicode character. |
| 15:13 | LocCode: | 0x00 | Place characters at the start of the buffer |
| | | 0x1 | Place characters after the last set of characters. It is up to the pendant to remember the current location to add characters to the buffer. |
| | | 0x2-7 | Reserved. |
| 12 | Num | 0x0 | UnicodeChar0 is valid and UnicodeChar1 is not valid |
| | | 0x1 | Both UnicodeChar0 and UnicodeChar1 are valid |
| 11:8 | PacketType | 0x4 | This is a Character Text Packet |
| 7:4 | DeviceId | ID | Device Identification |
| 3:0 | BusVersion | 0x1 | This is bus protocol version# |

*Fig. 15.*

| Bits | Field Designator | Value | Description |
|---|---|---|---|
| 47:40 | Reserved | 0x0 | Reserved |
| 39:24 | UnicodeChar | | This is the actual text character to be sent. If this is a Japanese keyboard in kana mode, then it may send the appropriate Unicode value for the kana key pressed. If this is a character that has a VK Code without a character code (i.e. an arrow key) then this value should be 0. |
| 23:16 | VirtualKeyCode | | This is a Virtual Key (VK)code to associate with this key. If there is no VK code, associated with this key (i.e. it has a Unicode Character) then this value may be 0. |
| 15:14 | RepeatCount | 0x0<br>0x1<br>0x2<br>0x3 | The event occurred once.<br>The event occurred twice.<br>The event occurred three times.<br>The event occurred four times. |
| 13 | NoKeyUp | 0x0<br>0x1 | This device will be sending a key-up event.<br>This device will not be sending a key-up event.<br><br>This bit is valid for a key down.<br>If the NO bit is set to 1, it means that the smart keyboard is not sending a key up for this key. When the host receives a packet with this bit set, it sends a key down to the system and then sends a key up. This allows the device to save bus bandwidth for single press (as apposed to press and hold) buttons. If this bit is set to 0, the host 1 expects the device to send a key up when the key is released. |
| 12 | UpDown | 0x0<br>0x1 | An up key-up event has occurred.<br>A down key-down event has occurred |
| 11:8 | PacketType | 0x2 | This is a smart keyboard packet |
| 7:4 | DeviceId | ID | Device Identification |
| 3:0 | BusVersion | 0x1 | This is bus protocol version # |

*Fig. 17.*

| Bits | Field Designator | Value | Description |
|---|---|---|---|
| 47:16 | Data | | Dependent on the Test field. |
| 15:13 | Test | 0x00 | Data value is 0x00000000 |
| | | 0x01 | Data value is 0xFFFFFFFF |
| | | 0x02 | Data value is 0x55555555 |
| | | 0x03 | Data value is 0xAAAAAAAA |
| | | 0x04 | Data value is 0x01234567 |
| | | 0x05 | Data value is 0x89ABCDEF |
| | | 0x06 | Data value is 0x31415926 |
| | | 0x07 | Data value is 0x27182818 |
| 12 | Loop | 0x0 | Don't send the packet back |
| | | 0x1 | Clear the loop bit and send the packet back to the sender |
| 11:8 | PacketType | 0xE | This is a Test Packet |
| 7:4 | DeviceId | ID | Device Identification |
| 3:0 | BusVersion | 0x1 | This is bus protocol version# |

*Fig. 18.*

| Bits | Field Designator | Value | Description |
|---|---|---|---|
| 47:12 | Data[35:0] | | Data |
| 11:8 | PacketType | 0xF | This is a Needs Driver Packet |
| 7:4 | DeviceId | ID | Device Identification |
| 3:0 | BusVersion | 0x1 | This is bus protocol version # |

*Fig. 19.*

SYSTEM AND METHOD FOR PENDANT BUS FOR SERIALLY CHAINING MULTIPLE PORTABLE PENDANT PERIPHERALS

RELATED APPLICATIONS

This application claims the benefit of U.S. Provisional Application No. 60/349,787 filed on Jan. 16, 2002, which is hereby claimed under 35 U.S.C. §119(e).

This application hereby incorporates by reference co-pending U.S. application Ser. No. 10/159,899 entitled "System and Method for a Pendant Bus," filed on May 29, 2002.

FIELD OF THE INVENTION

The present invention relates generally to bus communication, and more particularly to a bus communication protocol system and method between low-speed portable serial devices.

BACKGROUND OF THE INVENTION

Computing devices are becoming increasing more powerful and portable. With the increase in portability, end-users have also increased their desire to easily and inexpensively attach portable peripheral components to their portable computing devices. For example, an end-user purchasing a portable cellular phone or personal digital assistant (PDA) may wish to connect to it an external keypad, remote audio control, headphones, a game control device, or other similar low-speed portable devices. Moreover, the end-user may wish to connect many peripheral components at the same time to the portable host device.

Today, however, the end-user is provided a limited selection of portable peripheral components. Often, the selection is limited to a microphone and headphones. This limitation may arise because a host device manufacturer has implemented a proprietary bus architecture. The result is that the end-user is further limited to the peripherals provided by a single manufacturer.

While several bus architectures, such as USB, I2C, and SPI, exist today, none of them provide a simple, cost-effective, low-speed portable device.

Therefore, there is a need in the art for a system and method for providing a general purpose, functional bus for chaining low-speed portable peripheral components to a portable host device. It is with respect to these considerations and others that the present invention has been made.

SUMMARY OF THE INVENTION

This summary of the invention section is intended to introduce the reader to aspects of the invention and is not a complete description of the invention. Particular aspects of the invention are pointed out in other sections herein below, and the invention is set forth in the appended claims, which alone demarcate its scope.

The present invention provides a system and method for a communication protocol between serially chained pendant peripherals and a portable host device. The system protocol enables multiple low power input/output peripherals to communicate over a bi-directional data line with a portable host device such as a PDA or cellular phone.

In one aspect of the present invention, a computer-readable medium is encoded with a data structure for use in a pendant bus communications system. The data structure comprises a first data field, a second data field, and a third data field. The first data field includes a device identifier having a current value. The current value is modified each time the data structure is evaluated by a pendant peripheral device in the pendant bus communications system. The current value matches a predetermined value, if the data structure reaches a pendant peripheral device with which the data structure is associated. The second data field includes a packet type identifier. The packet type identifier includes information that describes actions to be taken by the associated pendant peripheral device in response to receiving the data structure. The third data field includes data bits. A format of the data bits is defined by the packet type identifier in the second data field.

In accordance with another aspect of the present invention, a computer-readable medium encoded with a message packet comprises a message packet means for communicating information between a pendant peripheral device and a host device over a serial pendant bus communications system. In another aspect of the computer-readable medium, the message packet means comprises one of a control type, a data type, a command type, an indicator type, a character text type, a bitmap text type, a smart keyboard type, a graphics type, a test type, and a Need Driver type.

In accordance with still another aspect of the present invention, a computer-implemented method is directed at determining whether a message packet received by a pendant peripheral device in a bus communications system is intended for the pendant peripheral device. The method evaluates a device identifier field associated with the message packet. The device identifier field includes a value associated with an intended pendant peripheral device. If the value corresponds to a predetermined value, then the method operates on the message packet. If the value is other than the predetermined value, then the method modifies the value of the device identifier field and communicates the message packet to another device in the bus communications system.

In accordance with yet another aspect of the present invention, a method for communicating a message to a pendant peripheral device in a bus communications system is provided. The method computes a value which if modified in a predictable manner by intervening pendant peripheral devices between a host-computing device and an intended pendant peripheral device results in a predetermined value associated with the intended pendant peripheral device. The method also issues the message including the computed value over the bus communications system.

In still another aspect of the present invention, a method is directed at indicating that a device has been plugged into a bus communications system. The method includes issuing a first control packet indicating that the device has been plugged into the bus communications system. The control packet describes features supported by the plugged-in device in a first level of detail. The method also includes receiving a second control packet requesting further detail of the supported features of the plugged-in device, and issuing a first data packet describing supported features of the plugged-in device in a second level of detail.

In yet another aspect of the present invention, a method is directed towards communicating that a pendant peripheral device has been unplugged from a bus communications system. The method includes receiving a message packet indicating an occurrence of an unplug event resulting from a pendant peripheral device being unplugged from the bus communications system. Moreover, the method includes evaluating the message packet to determine a value that indicates a number of intervening pendant peripheral devices between a host-computing device and the unplugged pendant peripheral device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 4 is a graphical representation of one embodiment of a control message packet format for use in a pendant bus communication system;

FIG. 5 is a graphical representation of one embodiment of an error control packet format for use in a pendant bus communication system;

FIG. 6 is a graphical representation of one embodiment of a plug/unplug packet format for use in a pendant bus communication system;

FIG. 7 is a graphical representation of one embodiment of a soft reset control packet format for use in a pendant bus communication system;

FIG. 8 is a graphical representation of one embodiment of a hard reset control packet format for use in a pendant bus communication system;

FIG. 9 is a graphical representation of one embodiment of a Get Device Capabilities control packet format for use in a pendant bus communication system;

FIG. 10 is a graphical representation of one embodiment of a Device globally Unique IDentifier (GUID) control packet format for use in a pendant bus communication system;

FIG. 11 is a graphical representation of one embodiment of a data message packet format for use in a pendant bus communication system;

FIG. 12 is a graphical representation of one embodiment of a command message packet format for use in a pendant bus communication system;

FIG. 13 is one embodiment of a table for possible application data information for use in an application data information field of the command message packet shown in FIG. 12;

FIG. 14 is a graphical representation of one embodiment of an indicator message packet format for use in a pendant bus communication system;

FIG. 15 is a graphical representation of one embodiment of a character text message packet format for use in a pendant bus communication system;

FIG. 17 is a graphical representation of one embodiment of a smart keyboard message packet format for use in a pendant bus communication system;

FIG. 18 is a graphical representation of one embodiment of a test message packet format for use in a pendant bus communication system;

FIG. 19 is a graphical representation of one embodiment of a Need Driver message packet format for use in a pendant bus communication system.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The term "circuit" means one or more passive and/or active components that are arranged to cooperate with one another to provide a desired function. The term "signal" means at least one current signal, voltage signal, or data signal. The meaning of "a," "an," and "the" include plural references. The meaning of "in" includes "in" and "on."

Briefly stated, the present invention provides a pendant bus communication protocol system and method for communicating between serially chained portable pendant peripherals and a portable host device. Moreover, a data structure is provided for a message packet for use in the pendant bus communication system.

Illustrative Environment

Figure 1:
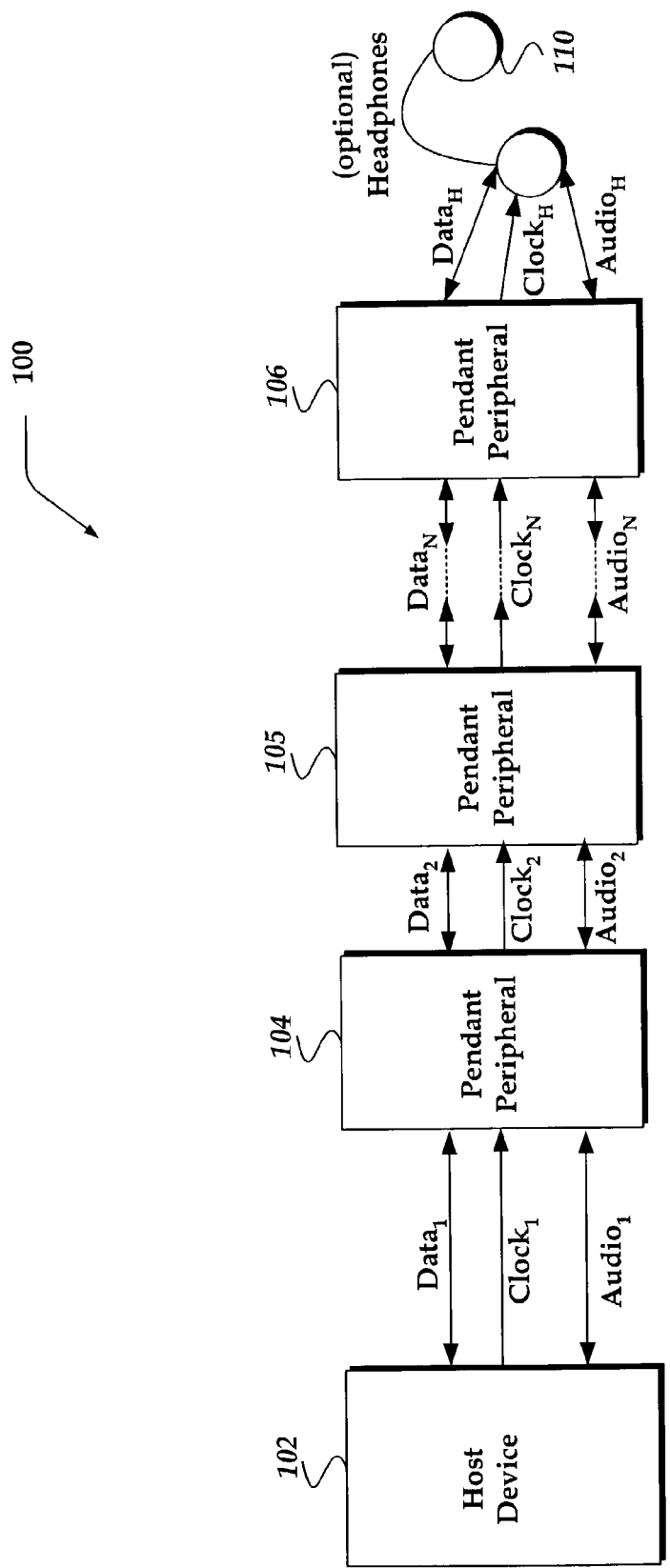
FIG. 1 illustrates a functional block diagram of an exemplary portable computing system incorporating a pendant bus communication system.

FIG. 1 illustrates a functional block diagram of one embodiment of an exemplary pendant bus communication system 100, in accordance with the present invention.

As shown in the figure, pendant bus communication system 100 includes host device 102, pendant peripherals 104-106, and optional headphones 110. Optional headphones 110 may include an optional microphone (not shown). Optional headphones 110 also may be replaced by an optional microphone (not shown). It is understood that while only three pendant peripherals (104-106) are illustrated in FIG. 1, the present invention is not so limited, and additional pendant peripherals may be included without departing from the scope or spirit of the present invention. For example, in one embodiment, pendant bus communication system 100 includes up to about 16 pendant peripherals that are serially chained together.

In the nomenclature of pendant bus communication system 100, an "upstream" pendant peripheral is the pendant peripheral closest to host device 102 of two connected pendant peripherals, while a "downstream" pendant peripheral is the pendant peripheral furthest from host device 102.

Pendant peripherals 104-106 may include any of a number of low power, low speed portable I/O devices that an end-user may wish to connect to host device 102. For example, pendant peripherals 104-106 may include a portable audio player control device, a portable keypad, a portable game control device, and the like. Pendant peripherals 104-106 also may be configured to provide graphical displays, as well as audio output or input for the end-user. Pendant peripherals 104-106 are described in more detail in conjunction with FIG. 3.

A typical low speed portable I/O device, suitable as a pendant peripheral, includes devices with bus speeds of up to about 25 KHz. One example of the present invention provides for a pendant peripheral with a transfer rate of about 3.84 Kbits per second, with about 25% pendant bus utilization.

Host device 102 is in communication with pendant peripheral 104 through $data_1$, $clock_1$, and $audio_1$ lines. Pendant peripheral 104 is in communication with pendant peripheral 105 through $data_2$, $clock_2$, and $audio_2$ lines. Similarly, downstream pendant peripheral 106 is in communication with a prior pendant peripheral in the serial chain through $data_N$, $clock_N$, and $audio_N$ lines. Optional headphones 110 are in communication with pendant peripheral 106 through $data_H$, $clock_H$, and $audio_H$ lines.

$Data_{1-N\ and\ H}$ lines provide a bi-directional communication path for message packets to be sent between host device 102 and a pendant peripheral in the chain employing a store-and-forward approach. Communications typically occurs between host device 102 and pendant peripheral 104-106, and not between two pendant peripherals. An exemplary $data_1$ line is described in more detail below in conjunction with FIG. 2.

$Clock_1$ line provides a clock signal $Clk_1$ (not shown) that is driven by a clocking circuit (not shown) in host device 102. Clock signal $Clk_1$ is directed towards controlling the timing of message packet transfers between host device 102 and pendant peripheral 104.

Similarly, $clock_2$ line provides a clock signal $Clk_2$ (not shown) that is driven by a clocking circuit (not shown) in pendant peripheral 104. $Clock_N$ line provides a clock signal $Clk_N$ (not shown) that is driven by a clocking circuit (not shown) in pendant peripheral 105; and $clock_H$ line provides a clock signal $Clk_H$ (not shown) that is driven by a clocking circuit (not shown) in pendant peripheral 106. That is, each clock line is always controlled by the upstream device. Moreover, each clock line is isolated from every other clock line. Each upstream device controls the transfer of message packets between itself and a downstream device, such that there is no contention for a data line.

$Audio_{1-N\ and\ H}$ lines support audio communications between host device 102 and optional headphones 100 (or optional microphone, not shown). Pendant peripherals 104-106 may also be configured to provide audio information on $audio_{2-N,\ and\ H}$ lines. Typically, however, audio information is 'passed' through pendant peripherals 104-106 to optional headphones 100. Moreover, it will be readily appreciated that $audio_{1-N,\ and\ H}$ lines may provide mono- or stereo-signals, without departing from the scope or spirit of the present invention.

A single cable is typically employed to bundle a given set of data, clock, and audio lines between two portable devices. For example, $data_1$, $clock_1$, and $audio_1$ lines are typically bundled into a single cable that may be coupled between host device 102 and pendant peripheral 104. A typical cable length may be upward towards six feet. Moreover, standard twisted unshielded cable may be employed, without departing from the scope or spirit of the present invention. Each cable employs a special 2.5 mm jack to couple the selected portable devices. The special 2.5 mm jack is downward compatible with standard 2.5 mm audio jack configurations.

Figure 2:
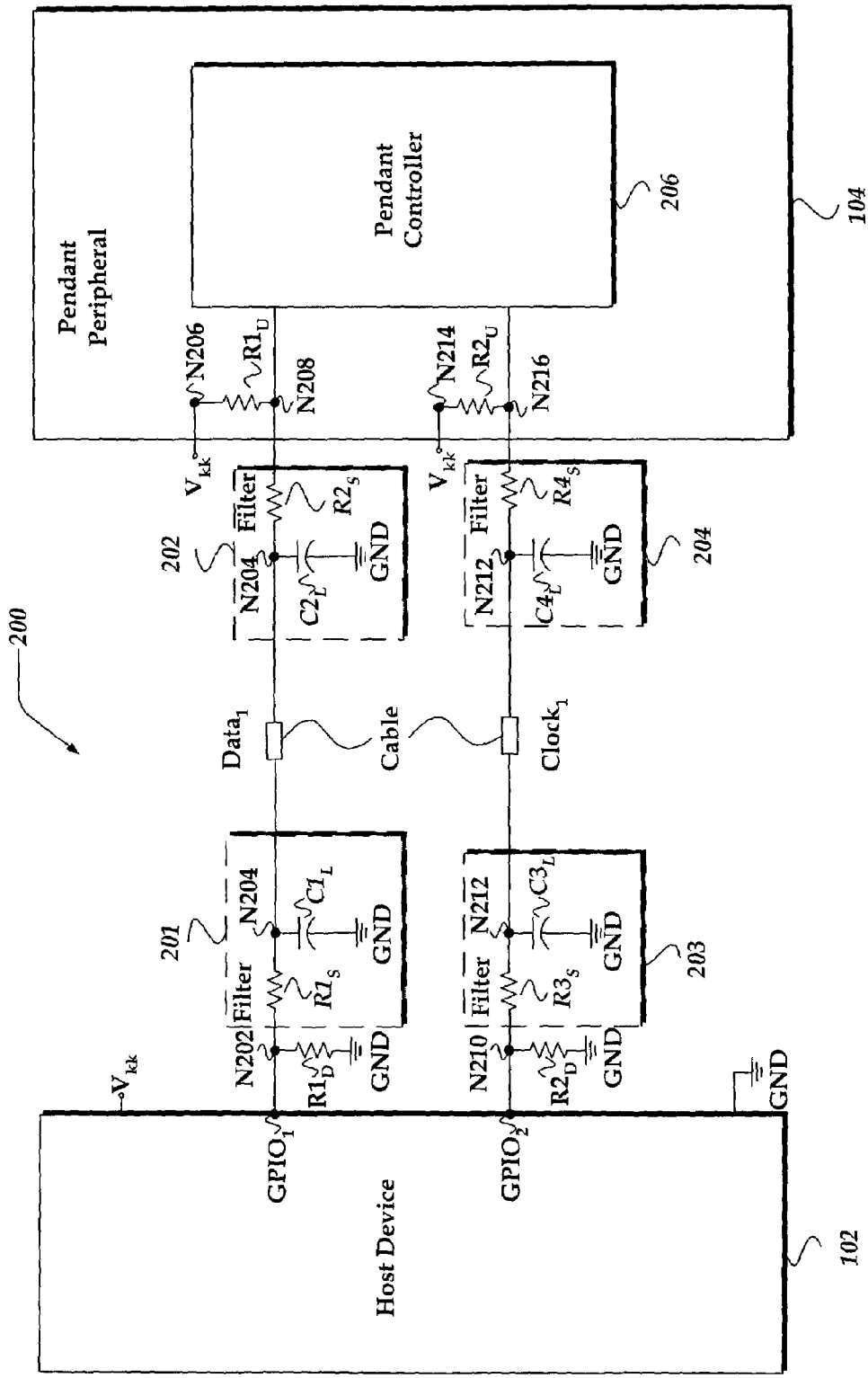
FIG. 2 is a schematic diagram illustrating exemplary data and clock lines, and circuitry of the pendant bus communication system shown in FIG. 1.

Included in each single cable are at least two additional lines (see FIG. 2). The first additional line provides power from host device 102 that may be employed by pendant peripherals 104-106. The second additional line provides a common ground. By providing power to pendant peripherals 104-106, a pendant peripheral need not include its own power source, thereby enabling it to be lighter in weight, and smaller in size.

FIG. 2 is a schematic diagram illustrating one embodiment of data and clock lines, and circuitry of pendant bus communication system 100 of FIG. 1, in accordance with the present invention. As seen in FIG. 2, host-pendant peripheral system 200 includes host device 102 and pendant peripheral 104, coupled through $clock_1$ line and a $data_1$ line. Pendant peripheral 104 includes pendant controller 206.

As shown in FIG. 2, $data_1$ line includes a cable, a first pull-down resister $R1_D$, a first series-drive resister $R1_S$, a first load capacitance circuit $C1_L$, a second series-drive resister $R2_S$, a second load capacitance circuit $C2_L$, and a first pull-up resister $R1_U$. Also shown in the figure, first series-drive resister $R1_S$ and first load capacitance circuit $C1_L$ comprise filter 201, while second series-drive resister $R2_S$ and second load capacitance circuit $C2_L$ comprise filter 202.

Host device 102 is coupled to $data_1$ line at node N202 through a first general-purpose input/output connection $GPIO_1$. First pull-down resister $R1_D$ is coupled between node N202 and a circuit ground potential GND. First series-drive resister $R1_S$ is coupled between node N202 and node N204. First load capacitance circuit $C1_L$ is coupled between node N204 and circuit ground potential GND. Second load capacitance circuit $C2_L$ is coupled between node N204 and circuit ground potential GND. Second series-drive resister $R2_S$ is coupled between node N204 and node N208. First pull-up resister $R1_U$ is coupled between node N206 and node N208. Pendant controller 206 is coupled to $data_1$ line at node N208.

Also shown in FIG. 2, $clock_1$ line includes a second pull-down resister $R2_D$, a third series-drive resister $R3_S$, a third load capacitance circuit $C3_L$, a fourth series-drive resister $R4_S$, a fourth load capacitance circuit $C4_L$, and a second pull-up resister $R2_U$. Moreover, shown in the figure, third series-drive resister $R3_S$ and third load capacitance circuit $C3_L$ comprise filter 203, while fourth series-drive resister $R4_S$ and fourth load capacitance circuit $C4_L$ comprise filter 204.

Host device 102 is also coupled to $clock_1$ line at node N210 through a second general-purpose input/output connection $GPIO_2$. Second pull-down resister $R2_D$ is coupled between node N210 and circuit ground potential GND. Third series-drive resister $R3_S$ is coupled between node N210 and node N212. Third load capacitance circuit $C3_L$ is coupled between node N212 and circuit ground potential GND. Fourth load capacitance circuit $C4_L$ is coupled between node N212 and circuit ground potential GND. Fourth series-drive resister $R4_S$ is coupled between node N212 and node N216. Second pull-up resister $R2_U$ is coupled between node N214 and node N216. Pendant controller 206 is also coupled to clock$_1$ line at node N216.

In one embodiment of the present invention, pendant peripheral 104 includes first and second pull-up resisters R1$_U$ and R2$_U$, and filters 202 and 204. Additionally, host device 102 includes first and second pull-down resisters R1$_D$ and R2$_D$, and filters 201 and 203.

In another embodiment, first pull-down resister R1$_D$ and second pull-down resister R2$_D$, are of approximately equal resistance values. Resistance values for first and second pull-down resisters R1$_D$ and R2$_D$ are selected to overcome any leakage current that may arise in data$_1$, line and clock$_1$ line, respectively, such that a "hard zero" value is approached when the line is unplugged. Typical values for first and second pull-down resisters R1$_D$ and R2$_D$ are between about 370K-10M ohms, and preferably are about 390K ohms. First, second, third, and fourth series-drive resisters R1$_S$, R2$_S$, R3$_S$, and R4$_S$, are all of approximately equal resistance values, ranging between about 0.95K to about 1.05K ohms. In one exemplary embodiment, first, second, third, and fourth series-drive resisters R1$_S$, R2$_S$, R3$_S$, and R4$_S$, are nominally 1K ohms. Moreover, first and second pull-resisters R1$_U$ and R2$_U$ are of approximately equal resistance values, ranging from between about 14K-16K ohms, and nominally about 15K ohms.

Similarly, first, second, third, and fourth load capacitance circuits C1$_L$, C2$_L$, C3$_L$, and C4$_L$ are approximately equal in capacitance values, ranging from between about 90 pF-110 pF, and nominally about 100 pF.

Filters 201-204 are arranged to operate as low-pass signal filters such that electromagnetic interference (EMI) is minimized on data$_1$ and clock$_1$ lines. Moreover, filters 201-204 also are arranged to protect against electrostatic discharges (ESD) of up to about 15 KV.

Pendant peripheral 104 may have more components, features, or functionality than illustrated in FIG. 2. Briefly, however, pendant controller 206 is arranged to receive, send, and process data$_1$ signals with another device. Moreover, pendant controller 206 may store received data$_1$ signals in message buffers (not shown), and forward received data$_1$ signals to yet another device in pendant bus communication system 100 Pendant controller 206 may also enable pendant peripheral 104 to format and display data$_1$ signals to an end-user. Pendant peripheral 206 may further receive inputs from the end-user, process the inputs, and transmit the inputs as data$_1$ signals upstream to host device 102.

In one embodiment, pendant controller 206 is implemented as a microprocessor. However, it is understood that other controller types could be utilized without departing from the scope or spirit of the invention.

In operation, a supply voltage V$_{kk}$ from host device 102 is coupled to node N206 and to node N214, to provide limited power to pendant peripheral 104. Supply voltage V$_{kk}$ typically ranges between about 2.7V-3.6V, and is nominally about 3.V. Moreover, supply voltage V$_{kk}$, together with first pull-up resister R1$_U$ creates an open-collector circuit configuration that enables pendant devices to communicate bi-directionally on a single data line.

First pull-up resister R1$_U$ operates to hold a data$_1$ line signal in a high (typically, a non-active, logical 1) state until pendant peripheral 104 drives the data$_1$ line signal low (a logical 0). That is, if pendant peripheral 104 wants to send a message packet to host device 102, pendant peripheral 104 first asserts (drives low) the data$_1$ line signal.

When pendant peripheral 104 is first coupled to data$_1$ line, first pull-up resister R1$_U$ operates to drive the data$_1$ line high, overriding a weak low signal level on data$_1$ line. Similarly, second pull-up resister R2$_U$ operates to pull the clock$_1$ line high. Once coupled to data$_1$ line, pendant peripheral 104 communicates a plug/unplug control packet to host device 102 by driving the data$_1$ line low, creating a logical 0. The drop in the data$_1$ line signal level is sensed by host device 102 and interpreted as pendant peripheral 104 being "plugged in."

When pendant peripheral 104 is unplugged or uncoupled from data$_1$ line, first pull-down resister R1$_D$ drives data$_1$ line to a ground potential. A logical 0 indicates a disconnect condition. Similarly, second pull-down resister R2$_D$ drives clock$_1$ line signal to a ground potential, creating a logical 0 on clock$_1$ line. When a downstream pendant peripheral, such as pendant peripheral 105 in FIG. 1 is unplugged, the upstream pendant peripheral detects the disconnect by sensing the logical 0 on the relevant data line. The upstream pendant peripheral then transmits a "unplug" packet (i.e., a plug/unplug control packet) to host device 102 indicating that a downstream pendant peripheral has been removed. A plug/unplug control packet format is described in more detail below in conjunction with FIGS. 3-4.

Pendant Messaging Packet Protocols

Figure 3:
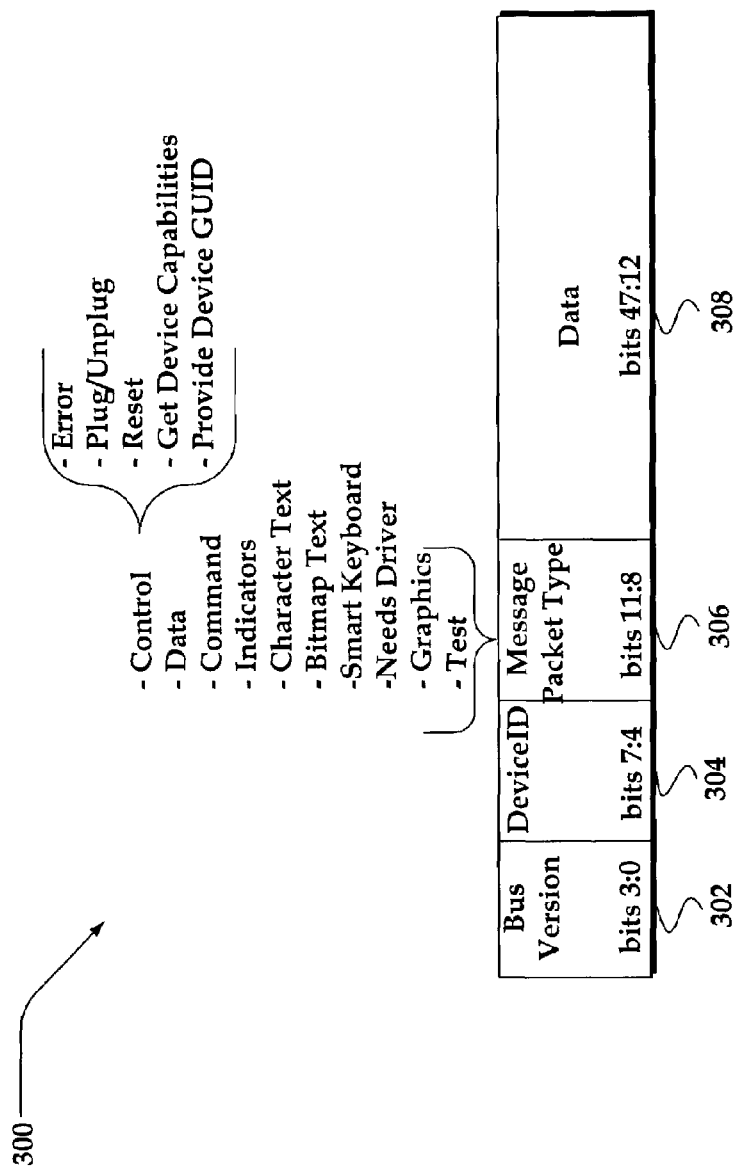
FIG. 3 is a graphical representation of a message construct or format for use in a pendant bus communication system.

FIG. 3 is a graphical representation of a message construct or format for use in pendant bus communications systems, in accordance with the present invention. The disclosed embodiment is but one format and alternatives will become readily apparent to those skilled in the art from the teachings of the present invention.

As shown in the figure, message packet 300 includes bus version field 302, device identifier field 304, message packet type field 306, and message data field 308.

The bus version field 302 represents the version of pendant bus communication protocol to which the message packet 300 adheres.

Device identifier field 304 dynamically associates message packet 300 with a pendant peripheral on the pendant bus. Each time message packet 300 is forwarded upstream (i.e., toward the host device), a forwarding pendant peripheral increments device identifier field 304 in the message packet. In one embodiment, device identifier field 304 is incremented by one. Upon reaching host device 102, the device identifier field 304 indicates where in the chain the pendant peripheral that originated message packet 300 is located. Similarly, each time message packet 300 is forwarded downstream, a forwarding pendant peripheral decrements the device identifier field 304. In one embodiment, device identifier field 304 is decremented by one. When the device identifier field 304 is zero, the message packet 300 has reached its destination. Thus, every pendant peripheral perceives its device identifier to be zero, thereby reducing enumeration overhead on the pendant bus. Moreover, host device 102 need only maintain a list of a location in the chain and a set of capabilities associated with each pendant peripheral in the chain.

It is readily apparent that device identifier field 304 need not be perceived as zero. For example, every pendant peripheral may perceive its device identifier to be one, minus one, or the like, without departing from the scope or spirit of the present invention.

Message packet type field 306 indicates a type of format of message data field 308. As shown in FIG. 3, message packet type 306 may indicate a variety of message packet types. Message packet type field 306 and associated message data field 308 are described in detail below.

In one embodiment of the present invention, message packet type field 306 represents control message packet types, data message packet types, command message packet types, indicator message packet types, character text message packet types, bitmap text message packet types, smart keyboard message types, graphics message packet types, test message packet types, and a Need Driver message packet type. Each of these message packet types is described below. The present invention, however, is not limited to these message packet types, and other message packet types may readily included without departing from the scope of spirit of the present invention.

Message data field 308 includes data that is employed by a selected device, such as pendant peripheral$_{1-N}$, or host device 102, in FIG. 1.

In one embodiment of the present invention, message packet 300 is 48 bits long. In message packet 300, as described in the present implementation, the 0 bit is the first bit to travel down data$_{1-N, \text{ and } H}$ lines of FIG. 1. Bits associated with message packet 300, however, typically are bitwise little endian. For example, a four bit value of 1, will travel down data$_{1-N, \text{ and } H}$ lines as a 1 followed by three 0s. Thus, as shown in FIG. 3, bus version field 302 includes bits 3 through 0. Device identifier field 304 includes bits 7 through 4. Message packet type field 306 includes bits 11 through 8, and message data field 308 includes bits 47 through 12.

Several embodiments of message packet 300 formats are now described for different message packet types, in accordance with the present invention, with reference to FIGS. 4-19.

The first message packet type described is a control message packet type. FIG. 4 is a graphical representation of one embodiment of a control message packet format for use in a pendant bus communication system, in accordance with the present invention. Control message packet types include error control packet types, plug/unplug control packet types, soft reset control packet types, hard reset control packet types, get device capabilities control packet types, and device Globally Unique Identifier (GUID) control packet types; each of which are described below.

FIG. 5 is a graphical representation of one embodiment of an error control packet format for use in a pendant bus communication system. Error control packet types include message packets where message data field 308 represents possible error (and no error) events. For example, message data field 308 may indicate an error if an end-user attempts to couple too many pendant peripherals to pendant bus communication system 100. An error may also arise if message packet 300 is recognizably garbled or if a multi-packet communication is out of sequence.

Plug/unplug control packet type is another control message packet type. FIG. 6 is a graphical representation of one embodiment of a plug/unplug control packet format for use in a pendant bus communications system, in accordance with the present invention. In this embodiment, plug/unplug control packet 600 includes message data field 608, structured as shown in FIG. 6. In one embodiment, message data field 608 is 16 bits long.

Plug/unplug control packet types are employed to indicate to host device 102 that a pendant peripheral is plugged into or removed from pendant bus communication system 100. Plug/unplug control packet types also indicate to host device 102 which message packet types a pendant peripheral is enabled to employ.

As briefly described above, when a pendant device first receives power, it communicates a plug/unplug control packet type to host device 102. If an upstream pendant peripheral is unplugged from a downstream pendant peripheral, the immediate downstream pendant peripheral that is still connected sends a plug/unplug control packet type with all bits in message data field 408 set to 0. If host device 102 sees a plug/unplug control packet type with a message data field set to 0, host device 102 interprets the packet as an unplug message packet type, and recognizes that the pendant peripheral after the one that sent the packet is unplugged.

FIG. 7 is a graphical representation of one embodiment of a soft reset control packet format for use in a pendant bus communication system, as another control message packet type. Soft reset control packet types may be communicated by host device 102 or by a pendant peripheral. In one embodiment of the soft reset control packet type, no data is included in its message data field.

If host device 102 communicates a soft reset control packet type to a pendant peripheral, the pendant peripheral resets any internal states and starts over as though it has just been plugged in. Moreover, after a soft reset, the reset pendant peripheral communicates a plug/unplug control packet type, described above.

If a pendant peripheral communicates a soft reset control packet type to host device 102, host device 102 interprets the message as though the pendant peripheral is unplugged. Host device 102 may no longer accept message packets from the pendant peripheral, until a plug/unplug control packet type is received from the 'unplugged' pendant peripheral. However, the 'unplugged' pendant peripheral still forwards upstream to host device 102 message packets from pendant peripherals further down the chain.

A pendant peripheral may select to communicate a soft reset control packet type to host device 102 if the pendant peripheral has a capability it wishes to power-down. For example, a pendant peripheral may include a display screen, but has not received message packets with display information for a pre-determined period of time. The pendant peripheral may select to power down the display screen to conserve power. The pendant peripheral does this by communicating a soft reset control packet type to host device 102. The pendant peripheral may then communicate to host device 102 a plug/unplug control packet type that does not include a definition of support for the display screen. Alternatively, the pendant peripheral may send a soft reset control packet and not send message packets thereafter. In either reset event, however, the pendant peripheral still forwards message packets from another device and still modifies the device identifier within the forwarded message packet.

FIG. 8 is a graphical representation of one embodiment of a hard reset control packet format for use in a pendant bus communication system. In one embodiment, the hard reset control packet type is sent by host device 102 to a pendant peripheral in the chain. No data need be included in the message data field of a hard reset control packet type.

If a pendant peripheral receives a hard reset control packet type, the receiving pendant peripheral interprets it as an instruction to force a hard reset of the pendant peripheral plugged immediately downstream to it. A hard reset message type may be communicated by host device 102, when host device 102 does not obtain a response from a selected pendant peripheral after an attempt to reset the selected pendant peripheral, such as with a soft reset control packet type, or the like. The hard reset control packet type enables host device 102 to hard reset a selected pendant peripheral without resetting all pendant peripherals upstream to the selected pendant peripheral.

If the selected pendant peripheral to be hard reset is the first device in the pendant bus chain, host device 102 may directly perform the hard reset by communicating a direct reset signal.

FIG. 9 is a graphical representation of one embodiment of a Get Device Capabilities control packet format for use in a pendant bus communication system, as another control message packet type. The get device capabilities (Get Dev Caps) control packet may be communicated by a host device to learn more about a capability of a selected pendant peripheral. For example, if the pendant peripheral's plug/unplug control packet type includes information indicating that the pendant peripheral supports character text, host device may communicate a Get Dev Caps control packet indicating a desire to learn more about the pendant peripheral's character text capabilities. The pendant peripheral responds with a data message packet type that includes the appropriate character text capabilities.

If host device 102 determines that it desires more information, host device 102 sends another Get Dev Caps control packet with an Extended Dev Caps bit set. It may be, however, that a given message packet type does not support Extended Dev Caps. If the message packet type does not support Extended Dev Caps, the pendant peripheral communicates an Error control packet type to host device 102.

FIG. 10 is a graphical representation of one embodiment of a Device Globally Unique IDentifier (GUID) control packet format for use in a pendant bus communication system, as another control message packet type. It is envisioned that pendant peripherals are capable of performing actions without associated software installed on host device 102. However, the present invention does enable pendant peripherals to be associated with software on host device 102.

If a pendant peripheral desires software on host device 102 to be associated with the pendant peripheral, the pendant peripheral requests the association be established though a Globally Unique IDentifier (GUID) stored in a system registry in host device 102. The pendant peripheral performs this request by communicating a Device GUID control packet to host device 102.

Additional system registry information may also be included that generates a request to the host device 102 to load a special driver to communicate with the pendant peripheral (see Needs Driver message packet type, below).

If the pendant peripheral associated with the installed software communicates a soft reset control packet type, host device 102 clears the GUID.

Host device 102 is configured to assume that a pendant peripheral does not require a GUID association. Thus, host device 102 sends an error control packet type if a pendant peripheral requests an action that is associated with installed software, and host device 102 has not received a Device GUID control packet type from the requesting pendant peripheral. The requesting pendant peripheral is expected then to communicate the Device GUID control packet type.

In one embodiment of the present invention, a Device GUID is 128 bits long. Thus, a pendant peripheral requesting association with software on host device 102 first communicates a Device GUID control packet type. The requesting pendant peripheral then communicates three data message packet types.

If the communications between host device 102 and the requesting pendant peripheral is broken prior to receipt of the appropriate message packets, host device 102 discards the received message packets. Host device 102 further communicates an error control packet type to the requesting pendant peripheral. Moreover, if host device 102 does receive the Device GUID control packet, but does not locate a matching GUID in the system registry, host device 102 sends an Error control packet type to the requesting pendant peripheral, indicating the requested software is not installed.

As indicated in FIG. 3, a message packet type that is other than a control message packet type includes data message packet types. FIG. 11 is a graphical representation of one embodiment of a data message packet format for use in a pendant bus communication system. Data message packet types may be communicated as responses to other message packet types.

FIG. 12 is a graphical representation of one embodiment of a command message packet format for use in a pendant bus communication system, as another message packet type. Command message packet types may be employed by a pendant peripheral to request actions from host device 102. For example, a pendant peripheral may request an application on host device 102, such as a media player, to play the next track.

As shown in FIG. 12, command message packet types include application data information 1202. Application data information 1202 need not be specific to a particular vendor. For example, application data information 1202 for a 'media player' may enable a Microsoft media player and a Real Audio Player. FIG. 13 is one embodiment of a table for possible application data information for use in an application data information field of the command message packet shown in FIG. 12.

If application data information 1202 is null (all 0s), then the command message packet type is interpreted by host device 102 to be intended for whatever application is currently in a foreground mode in host device 102.

If a pendant peripheral wishes to make use of an application on host device 102, the pendant peripheral determines whether the appropriate software that maps the application to the requesting pendant peripheral is loaded on host device 102. Moreover, the requesting pendant peripheral sends a Device GUID control packet type to host device 102 prior to sending a command message packet type. If a pendant peripheral sends a command message packet type for an application without first sending a Device GUID control packet type, an error message packet type may be sent by host device 102.

Moreover, command message packet types may have different meanings depending on which application the command message packet type is sent. For example, a command message packet type that includes a 'next' command in a command field 1204 of the command message packet (see FIG. 12) might result in an action to play the next song when sent to media player. However, the same command message packet type might result in an action of going to a next page if the command message packet type is sent to an electronic book reader. Thus, a receiving application on host device 102 determines how to interpret an action in the application data information field of a command message packet. The receiving application may even select to ignore an action.

FIG. 14 is a graphical representation of one embodiment of an indicator message packet format for use in a pendant bus communication system, as still another message packet type. Host device 102 employs indicator message packet types to a drive various indicators such as LEDs, graphical displays, and the like, on a selected pendant peripheral. In one embodiment, the selected pendant peripheral determines the actions taken when an indicator message packet type is received. For example, an indicator message packet that includes a request for a sound may be interpreted by the selected pendant peripheral as a request to mix multiple indicators into a single LED display.

FIG. 15 is a graphical representation of one embodiment of a character text message packet format for use in a pendant bus communication system, as another message packet type. A character text message packet may be communicated by host device 102 to a selected pendant peripheral. Character text message packet types may be employed for example, in a pendant peripheral that might display a name of song that is playing on host device 102. Thus, a pendant peripheral that supports character text message packet types should support a Get Dev Caps control packet type from host device 102.

In one embodiment of the present invention, character text is communicated to a selected pendant peripheral as Unicode included within a message data field. Received character text is formatted and displayed by the selected pendant peripheral, in a supported font type. If the received character text exceeds the display size of the selected pendant peripheral, the character text may be scrolled. Scrolling support may be performed by the selected pendant peripheral.

In one embodiment of the present invention, each character text message packet type communicates up to about two Unicode characters along with additional code bits indicating a sequence of storage for the Unicode characters. As character text messages need not include null terminators, a selected pendant peripheral is configured to recognize the last character text that host device 102 communicated.

To clear a display screen on a selected pendant peripheral, host device 102 may communicate a character text message packet type that includes a Loc Code of 0, along with a Char Code of Null (all bits are 0).

Bitmap text message packet type is another message packet type that host device 102 may employ to communicate information intended for display on a display screen of a selected pendant peripheral. Bitmap text message packet types may be employed in conjunction with character text message packet types for example, to display Japanese Kanji and similar Far East characters as bitmap text.

If a pendant peripheral indicates that it supports bitmap text message packet types, then character text not supported by the pendant peripheral may be sent as a bitmapped text.

Figure 16:
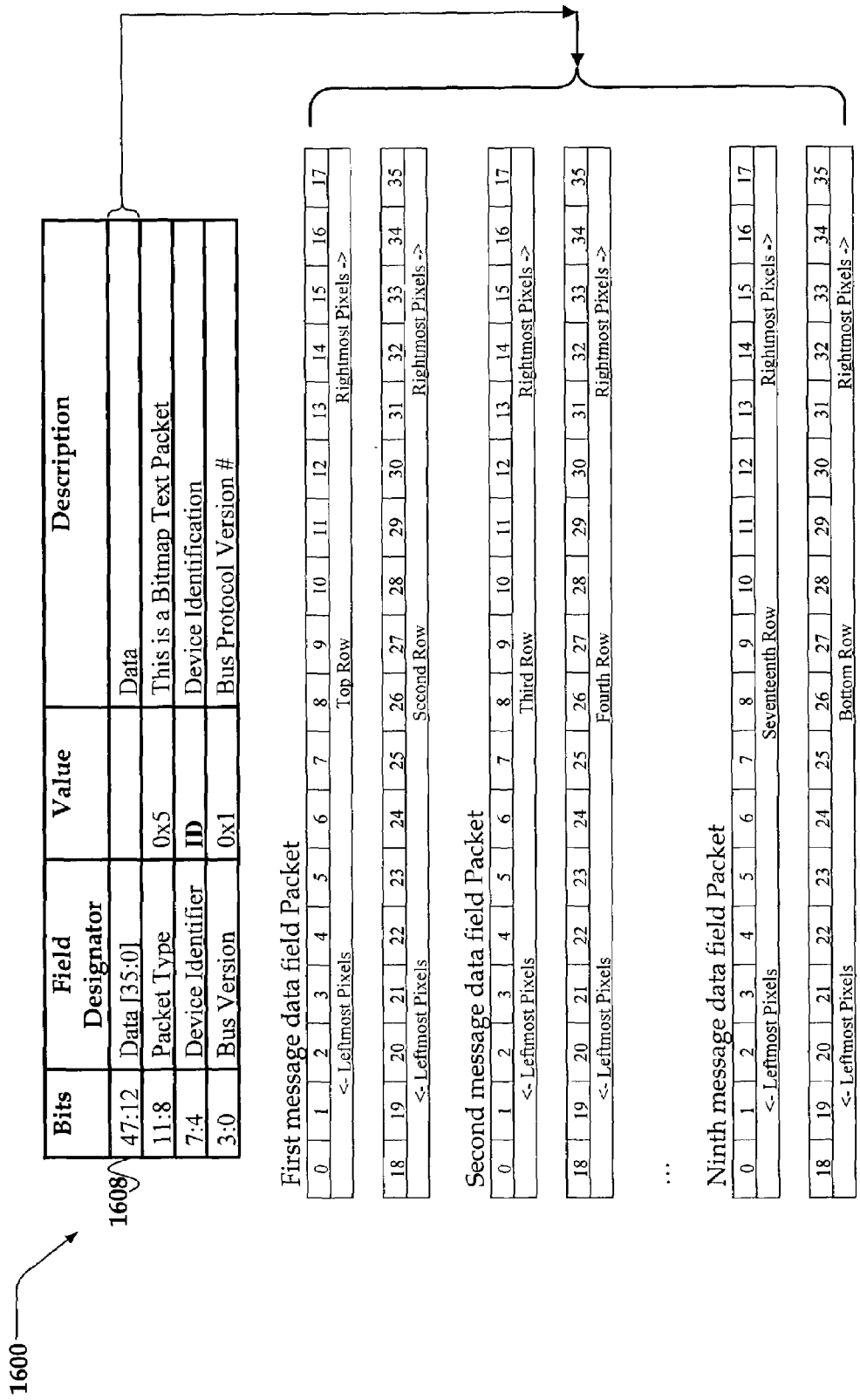
FIG. 16 is a graphical representation of one embodiment of a bitmap text message packet format for use in a pendant bus communication system.

FIG. 16 is a graphical representation of one embodiment of a bitmap text message packet format for use in a pendant bus communication system. As shown in the figure, a single bitmap character may employ up to about nine contiguous bitmap text message packets, with potentially different content in message data field 1608. To speed up transfer of the bitmap text message packets, in one embodiment of the present invention, no sequencing bits are employed. Because the nine bitmap text message packets are sent as a contiguous sequence of message packets, an error event is flagged if the nine bitmap text message packets are not received by the selected pendant peripheral.

As illustrated in FIG. 16, a first data bit in the message data field of the first bitmap text message packet defines the value of the upper left corner of a bitmap text character.

A message packet type that may be employed to display graphics is a graphics display message packet type. Host device 102 may employ the graphics display message packet type to communicate graphical images to a pendant peripheral that has identified itself as supporting graphics.

FIG. 17 is a graphical representation of one embodiment of a smart keyboard message packet format for use in a pendant bus communication system, as another message packet type. If a pendant peripheral supports buttons or keys and a display, then smart keyboard message packet type may be employed by the pendant peripheral to direct host device 102 to provide text for display as a result of a key or button entry.

A pendant peripheral that supports smart keyboard message packet types includes additional software and related hardware to track states arising from a keystroke, such as shift keys and the like.

FIG. 18 is a graphical representation of one embodiment of a test message packet format for use in a pendant bus communication system. A test message packet type is provided for performing loop tests. For example, if the test message packet type with a Loop bit set high is received by host device 102, host device 102 loops back the message packet, so that the sending pendant peripheral may conduct a self-test. If a test message packet type with a Loop bit set high is received by a pendant peripheral, the pendant peripheral clears the Loop bit and returns the test message packet to host device 102.

FIG. 19 is a graphical representation of one embodiment of a Need Driver message packet format for use in a pendant bus communication system. A Need Driver message packet type may be employed when a pendant peripheral requires a software driver on host device 102 to be associated with the pendant peripheral. The requesting pendant peripheral may communicate a Device GUID control packet type, prior to communicating a Need Driver message packet type.

Generalized Operation

The operation of certain aspects of the present invention will now be described with respect to FIGS. 1 and 20. In the nomenclature of pendant bus communication system 100, in FIG. 1, a "read" is defined as moving a message packet from a pendant peripheral, such as pendant peripheral 104, to an upstream host device, such as host device 102. A "write" is defined as moving a message packet from an upstream host device, such as host device 102, to a downstream pendant peripheral, such as pendant peripheral 104. As described above in conjunction with FIG. 1, each set of clock and data lines between portable peripherals are isolated from each other, such that a "read" or "write" may occur separately between two pendant peripherals. For example, a "read" may occur when moving a message packet from pendant peripheral 105 to its upstream "host device," pendant peripheral 104. Similarly, an isolated "write" may occur when moving a message packet from pendant peripheral 104 downstream to pendant peripheral 105.

A packet transfer protocol is employed to clock message packets between host device 102 and a pendant peripheral in the pendant peripheral communication system 100. The packet transfer protocol is described in a co-pending application, Ser. No. 10/159,899 entitled "System and Method for a Pendant Bus," filed May 29, 2002, and is hereby incorporated by reference. Briefly, however, when $data_1$ and $clock_1$ lines, in FIG. 1, are idle (e.g., pulled high), pendant peripheral 104 may request a read of a message packet by asserting (driving low) the $data_1$ line signal. Alternatively, host device 102 may commence a write of a message packet by asserting the $clock_1$ line signal. Host device 102 determines whether the message packet transfer will be a read or a write transfer. Clock signal(s) $Clk_1$ are provided by host device 102 over the $clock_1$ line to manage the transfer of the message packet as a series of bits over the $data_1$ line.

Host device 102 may further select to send a message packet directed to pendant peripheral 105. To do so, host device 102 associates a device identifier of 1 with the message packet. As pendant peripheral 104 receives the bits for message packet from host device 102, they are stored in a buffer (not shown). Upon a successful transfer of the message packet, pendant peripheral 104 processes the message packet to determine if it owns the message packet (e.g., whether the device identifier equals zero). If pendant peripheral 104 determines that the device identifier is other than zero, pendant peripheral 104 decrements the device identifier associated with the message packet. Pendant peripheral 104 asserts the clock$_2$ line signal to indicate intent to transfer a write message packet to pendant peripheral 105. Pendant peripheral 104 then drives clock signal(s) Clk$_2$ over the clock$_2$ line to regulate the transfer of the modified message packet to pendant peripheral 105.

As pendant peripheral 105 receives the bits for the modified message packet, they are stored in its buffer (not shown). Upon a successful transfer of the message packet, pendant peripheral 105 processes the message packet to determine whether the device identifier associated with the modified message packet is zero. If the device identifier is zero, pendant peripheral 105 processes the message packet to determine the message packet type.

If pendant peripheral 105 wishes to send a read message packet to host device 102, the read message packet is sent to pendant peripheral 104 to be relayed upstream, performing substantially similar actions as described above. However, when pendant peripheral 104 receives the read message packet, it increments the device identifier associated with the read message packet. Pendant peripheral 104 then proceeds to communicate the modified message packet upstream to host device 102.

As described above, a message packet type may initiate a flow or sequence of message packet types. FIG. 20 illustrates message flow diagrams for one implementation of messaging protocol flows between a pendant host device and a pendant peripheral, in accordance with the present invention.

Figure 20:
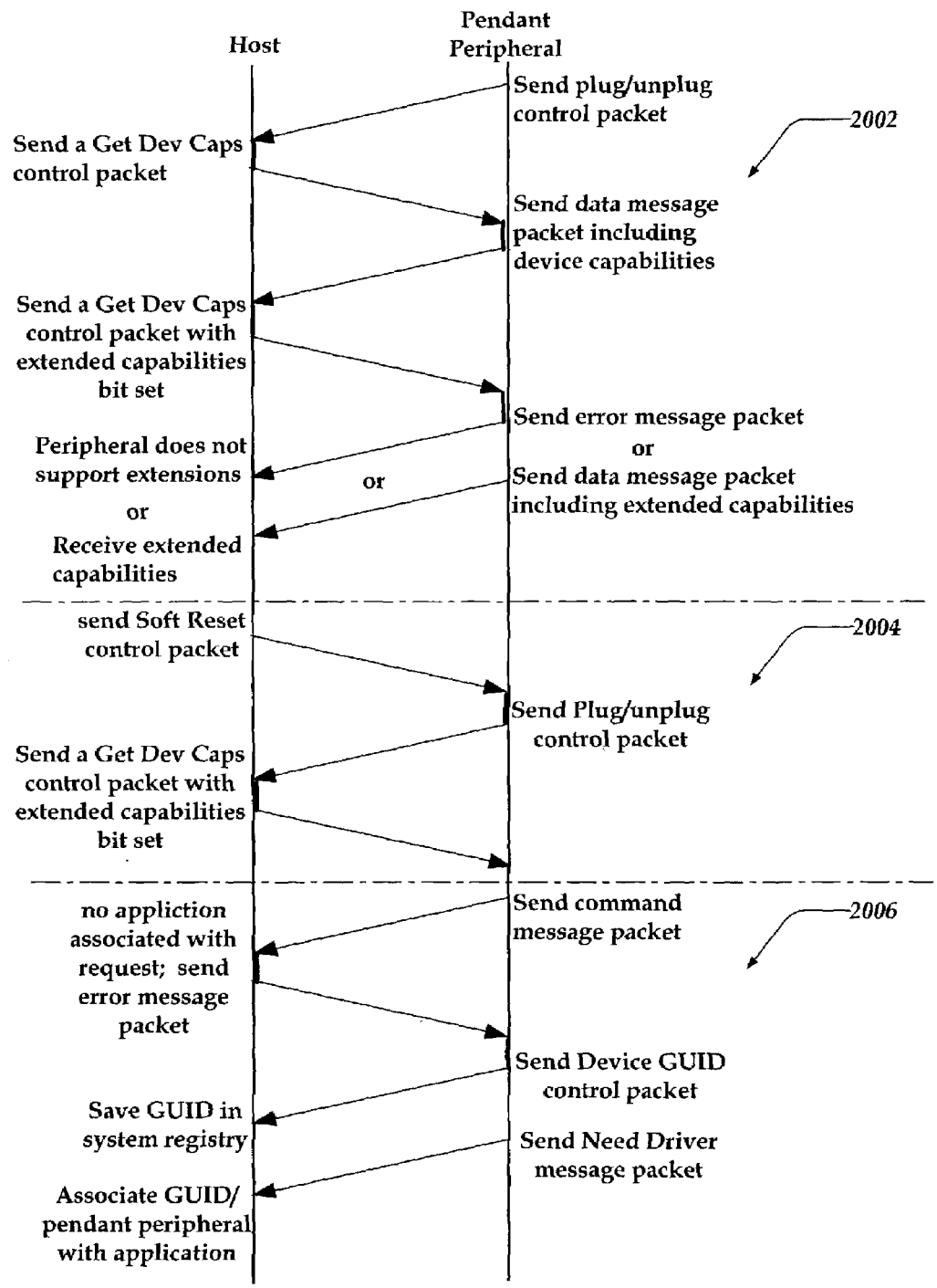
FIG. 20 are message flow diagrams illustrating one implementation of messaging protocol flows between a pendant host device and a pendant peripheral, in accordance with the present invention.

Shown in FIG. 20 is device initiation message flow 2002. A pendant peripheral communicates a plug/unplug control packet type to the host device, when the pendant peripheral is first plugged into the pendant bus communication system. Upon receipt of the plug/unplug control packet, host device 102 communicates a Get Dev Caps control packet to the pendant peripheral associated with the plug/unplug control packet, as indicated by the device identifier included in the message packet.

Upon receipt of the Get Dev Caps control packet, the identified pendant peripheral responds by communicating a data message packet. The data message packet includes a device capability structure in the message data field for the capabilities supported by the identified pendant peripheral.

If host device 102 determines it desires more information about the capabilities of the identified pendant peripheral, host device 102 may send a Get Dev Caps control packet with the extended capabilities bit set.

Upon receipt of the Get Dev Caps control packet with the extended capabilities bit set, the identified pendant peripheral may select to respond with a data message packet that provides information in the message data field about the extended capabilities supported. Alternatively, if the identified pendant peripheral does not support extended capabilities for a device capability, the identified pendant peripheral communicates to host device 102, an error message packet.

Also shown in FIG. 20, is a soft reset message flow 2004. As shown in the figure, soft reset message flow 2004 may commence when host device 102 communicates a soft reset control packet to an identified pendant peripheral. Upon receipt of the soft reset control packet, the identified pendant peripheral performs a reset of itself, and responds to host device 102, by communicating a plug/unplug control packet. If host device 102 receives the plug/unplug control packet, performs substantially the same actions as described above in device initiation message flow 2002.

Although not illustrated in FIG. 20, but described above, a pendant peripheral may also initiate a soft reset control packet. The initiating pendant peripheral may communicate a plug/unplug control packet at some later time.

FIG. 20 also shows an associate host driver message flow 2006. A requesting pendant peripheral may initiate a request for an application residing on host device 102 to perform an action, by communicating a command message packet to host device 102. Upon receipt of the command message packet, host device 102 determines whether an application is associated with the requesting pendant peripheral. If an application is not associated with the requesting pendant peripheral, host device 102 responds by communicating an error message packet to the requesting pendant peripheral.

Upon receipt of the error message packet, the requesting pendant peripheral proceeds to communicate to host device 102 a Device GUID control packet. If host device 102 receives the Device GUID control packet, it will store the received GUID in a system registry. The requesting pendant peripheral proceeds to communicate a Need Driver message packet to host device 102. Upon receipt of the Need Driver message packet, host device 102 associates the stored GUID with an identified application. The requesting pendant peripheral may then proceed to retransmit a command message packet. The host device 102 having associated an identified application to a registered pendant peripheral performs the requested commands.

The above specification, examples, and data provide a complete description of the manufacture and use of the composition of the invention. However, various changes in size, shape, materials, components, circuit elements, wiring connections, and contacts, as well as in the details of the illustrated circuitry and construction and method of operation may be made without departing from the scope or spirit of the present invention. Thus, the invention resides in the claims hereinafter appended.

We claim:

1. A computer-readable medium encoded with a data structure for use in a pendant bus communications system that includes a host device and pendant peripheral devices that are serially chained together, the data structure comprising:

a first data field including a device identifier having a current value, the current value being modified each time the data structure is evaluated by one of the pendant peripheral devices in the pendant bus communications system, wherein the current value matches a predetermined value if the data structure reaches one of the pendant peripheral devices with which the data structure is associated; wherein the predetermined value is the same value for each of the pendent peripheral devices;

a second data field including a packet type identifier, wherein the packet type identifier includes information that describes actions to be taken by the associated pendant peripheral device in response to receiving the data structure; and a third data field including data bits, wherein a format of the data bits is defined by the packet type identifier in the second data field.

2. The computer-readable medium of claim 1, wherein the predetermined value is zero.

3. The computer-readable medium of claim 1, wherein the current value is incremented by the evaluating pendant peripheral device as the data structure is communicated upstream in the pendant bus communication system.

4. The computer-readable medium of claim 1, wherein the current value is decremented by the evaluating pendant peripheral device as the data structure is communicated upstream in the pendant bus communication system.

5. The computer-readable medium of claim 1, wherein the packet type identifier is a selected one from a group comprising a control message packet type, a data message packet type, a command message packet type, an indicator message packet type, a character text message packet type, a bitmap text message packet type, a smart keyboard message type, a graphics message packet type, a test message packet type, and a Need Driver message packet type.

6. The computer-readable medium of claim 5, wherein the control message packet type identifier is selected from a group consisting of an error control packet type, a plug/unplug control packet type, a soft reset control packet type, a hard reset control packet types a get device capabilities control packet type, and device Globally Unique Identifier (GUID) control packet type.

7. The computer-readable medium of claim 1, wherein the data structure further comprises a bus version that identifies a version of the pendant bus communications system.

8. The computer-readable medium of claim 1, wherein the data structure comprises a message packet.

* * * * *